Aug. 28, 1962     C. C. SANDERSON     3,050,923
OVERLOAD COUPLING FOR LAWN MOWER BLADE
Filed July 19, 1960

Carl C. Sanderson
INVENTOR.

BY *Clarence A. O'Brien*
*and Harvey B. Jacobson*
Attorneys 3,050,923
OVERLOAD COUPLING FOR LAWN
MOWER BLADE
Carl C. Sanderson, Vardaman, Miss., assignor of one-third to Thomas D. Morrow, Calhoun, Miss.
Filed July 19, 1960, Ser. No. 43,812
3 Claims. (Cl. 56—25.4)

This invention relates to an overload release coupling between the drive shaft and cutting blade in a rotary type lawn mower.

It is therefore a primary object of this invention to provide an overload release coupling between the drive shaft and cutting blade of a rotary type lawn mower so that the rotary blade when contacting a solid object will slip relative to its drive shaft to thereby prevent damage to the blade or the drive shaft.

Another object of this invention in accordance with the foregoing object, is to provide an overload release coupling between the rotary cutting blade and the drive shaft of a rotary type lawn mower wherein the coupling connection is of the requisite rigidity as to permit the cutting of grass and heavy undergrowth without slipping.

A further object of this invention in accordance with the foregoing objects is to provide an overload slip coupling between the drive shaft and the rotary cutting blade of a rotary type lawn mower which may be readily assembled and which is made up of a minimum of parts to thereby make the overload clutch or coupling device widely useful for various types of lawn mowers as well as economically feasible.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1:
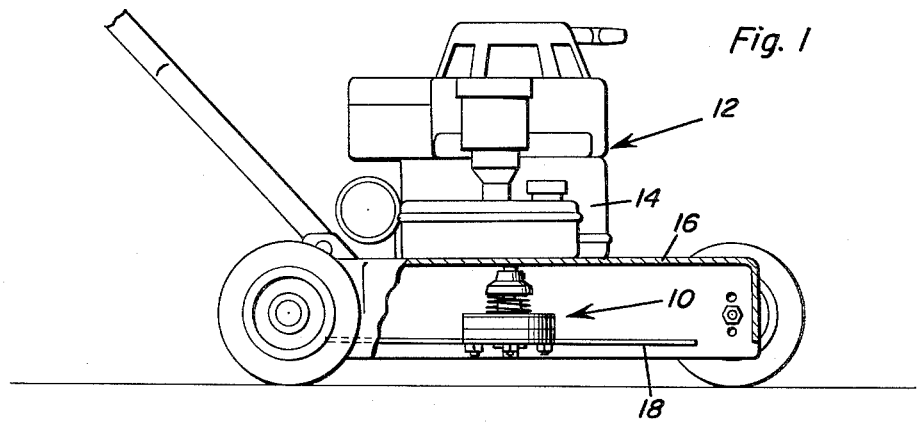
FIGURE 1 is a side elevational view of a rotary type lawn mower with parts broken away so as to show the overload slip device installed in accordance with this invention.
Figure 2:
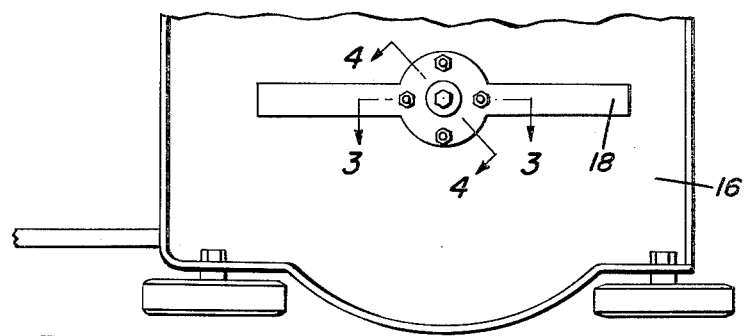
FIGURE 2 is a fragmentary bottom view of the lawn mower.

Referring to the drawings in detail, FIGURE 1 illustrates a typical type of rotary lawn mower generally indicated by reference numeral 12 which includes the usual type of engine 14 mounted on a base 16 within which the rotary cutting blade 18 is disposed and connected to the engine drive shaft by means of the overload slip device generally indicated by reference numeral 10.

Figure 3:
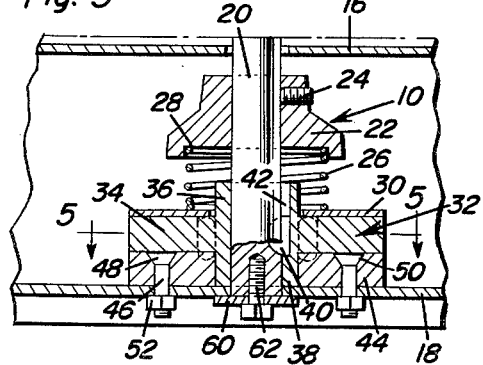
FIGURE 3 is an enlarged sectional view taken through a plane indicated by section line 3—3 in FIGURE 2.
Figure 4:
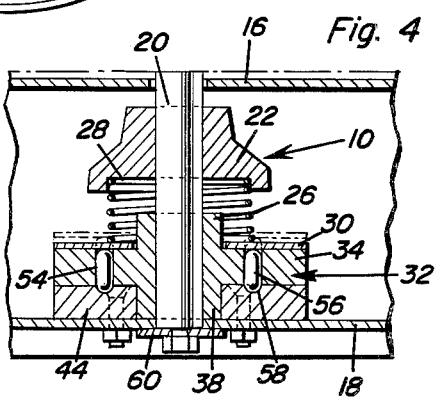
FIGURE 4 is an enlarged sectional view taken through a plane indicated by section line 4—4 in FIGURE 2.
Figure 5:
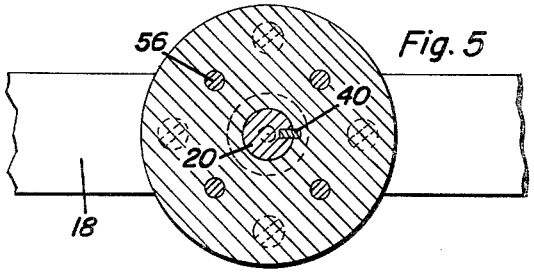
FIGURE 5 is a sectional view taken through a plane indicated by section line 5—5 in FIGURE 3.

Referring now to FIGURES 3 and 4 in particular, it will be observed that the engine drive shaft 20 extends downwardly through the top of the mower base 16 for the purpose of being connected to the blade 18 by means of the overload slip device 10. Accordingly, an abutment member 22 of the device 10 is fastened to the drive shaft 20 just beneath the base 16 by means of a setscrew 24 as seen in FIGURE 3. The other parts of the overload slip device 10 are then assembled from the lower end of the drive shaft 20 beneath the abutment member 22.

It will therefore be further observed that an axial coil compression spring 26 is disposed beneath the abutment member 22 and fits within a recess 28 formed within the bottom of the abutment member 22. An annular pressure plate 30 is disposed beneath the coil spring 26 and is urged downwardly thereby. The pressure plate 30 is therefore disposed on top of a clutch disc generally indicated by reference numeral 32. The pressure plate 30 is therefore fitted over the disc portion 34 of the clutch disc 32, said clutch disc 32 also having an axial sleeve 36, 38 which includes an upper portion 36 which extends through the pressure plate 30 and within the coil spring 26. The sleeve also includes a lower portion 38 which extends downwardly into abutting relation with the blade 18. The sleeve 36—38 is accordingly splined to the drive shaft 20 by means of a key element 40 on the shaft 20 fitted within a keyway 42 in the sleeve as seen in FIGURE 3. The clutch disc 32 is thereby rotatably connected to the drive shaft 20 and axially slidable thereon.

Rotatably mounted on the lower sleeve portion 38 is a coupling disc 44 which is fastened to the blade 18 by means of a plurality of bolts 46 which have tapered heads 48 fitted within counterbores 50 formed within the upper surface of the coupling disc 44 so as to clear the lower surface of the clutch disc 32. The blade 18 is therefore fastened to the coupling disc 44 by means of the bolts 46 with which the nuts 52 are threadedly engaged to clamp the blade 18 between the nuts and the undersurface of the coupling disc 44.

Referring now to FIGURE 4, it will be observed that a plurality of parallel axially extending bores 54 are formed within the disc portion 34 of the clutch disc 32 while a cam element 56 is disposed within each of the bores 54, said cam element 56 constituted by plungers having rounded upper and lower ends. Disposed within the upper surface of the coupling disc 44 are a plurality of recesses 58 which are in registry with the bores 54 or the lower ends of the cam elements 56 as will be seen in FIGURE 4. It will also be observed that the lengths of the cam plunger elements 56 are equal to the thickness of the disc portion 34 of the clutch disc 32 plus the depth of the recesses 58 in the coupling disc 44.

In order to maintain all of the parts in their assembled condition, a thrust washer element 60 is disposed beneath the lower end of the drive shaft 20 and abuts up against the rotary blade 18, said thrust washer being fastened to the lower end of the drive shaft 20 by means of a threaded screw 62.

From the foregoing description operation of the overload slip device 10 will become apparent. It will therefore be observed that the drive shaft is ordinarily rotatively connected to the blade 18 by means of the spline 40 which connects the clutch disc 32 to the drive shaft and by means of the cam elements 56 which ordinarily connect the clutch disc 32 to the coupling disc 44 as shown in FIGURE 4, the rotary blade 18 being fastened to the coupling disc 44 by means of the bolts 46. Accordingly, the drive shaft is connected to the blade 18 with sufficient strength to cause the blade to cut grass and heavy undergrowth without slipping. If, however, the blade 18 comes in contact with a solid object or is overloaded in some other manner, the overload reacting through the recesses 58 on the coupling disc 44 will cam the cam plunger elements 56 upwardly into engagement with the pressure plate 30 which will thereby be forced upwardly against the bias of the coil spring 26 as for example shown by dotted line in FIGURE 4. Accordingly, the cam elements 56 will be withdrawn from engagement with the recesses 58 and the coupling disc 44 so as to permit the continuously rotating clutch disc 32 fastened to the drive shaft 20 to rotate relative to the coupling disc 44 and the blade fastened thereto. When the cam elements 56 once again become aligned with the recess 58 on the coupling disc 44 the cam elements will again be urged into the recesses 58 by means of the spring 26 acting through the pressure plate 30 so that if the overload no longer exists the coupling disc 44 and blade 18 will once again be coupled to the clutch disc 32.

From the foregoing, it will be observed that a highly efficiently operating overload release device is disclosed and which device is of extreme trouble-free simplicity and capable of being readily assembled in all types of rotary lawn mower installations.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A method of assembling a rotary cutting blade of a rotary type lawn mower on a vertically depending engine shaft, comprising the steps of: fastening an abutment member to said shaft axially spaced from its bottom end; inserting an axial coil spring over said shaft and up against said abutment member; positioning an annular pressure plate under said coil spring; splining on the shaft a clutch disc having an upper sleeve extending through the pressure plate and a lower sleeve, with the upper side of the clutch disc disposed beneath said pressure plate; inserting cam elements into bores extending axially through said clutch disc; rotatably mounting a blade coupling disc on said lower sleeve with recesses on its upper surface in registry with said bores and cam elements on the clutch disc; bolting the rotary blade to the underside of said coupling disc while it abuts against a lower end of said lower sleeve; and securing an axial thrust washer to the bottom end of the shaft to abut against the blade.

2. An overload coupling device for rotary type lawn mowers having a vertically disposed engine shaft and a rotary blade connected thereto, comprising, abutment means fastened to said shaft in axially spaced relation to its bottom end, coil spring means disposed around said shaft beneath said abutment means, pressure plate means disposed beneath said spring means and biased downwardly thereby, clutch disc means splined to said shaft and having an upper sleeve portion extending through said pressure plate means, a lower sleeve portion and a plurality of parallel bores disposed in a disc portion of said clutch disc means, cam means disposed within said bores abutting against said pressure plate means, blade disc means rotatably mounted on said lower sleeve portion having a plurality of recesses in registry with said bores for receiving the lower end of said cam means, a blade abutting against said coupling disc means and lower sleeve, fastener means for connecting said coupling disc means to said blade and thrust bearing means secured to the bottom end of said shaft beneath said blade to maintain the device in assembled condition.

3. The device as defined in claim 2, wherein said cam means comprise a plurality of plungers having rounded ends, said plungers being of a length equal to the thickness of said disc portion plus the depth of one of said recesses, and said abutment means comprise an annular flange axially slidable on said shaft and a set screw threaded radially through a portion of said flange, one end of said screw engaging said shaft.

References Cited in the file of this patent

UNITED STATES PATENTS

| | | |
|---|---|---|
| 1,883,164 | Vessakos | Oct. 18, 1932 |
| 2,471,367 | Cavaness | May 24, 1949 |
| 2,561,913 | Dodge | July 24, 1951 |
| 2,643,530 | Lathrop | June 30, 1953 |
| 2,685,160 | Kuhany et al. | Aug. 3, 1954 |
| 2,707,362 | Thelander | May 3, 1955 |
| 2,809,488 | Sewell | Oct. 15, 1957 |